United States Patent
Auyeung et al.

(10) Patent No.: US 9,255,703 B2
(45) Date of Patent: Feb. 9, 2016

(54) LIGHT PIPE HEAT SINK ELEMENT

(71) Applicant: Lenovo Enterprise Solutions (Singapore) Pte. Ltd., Singapore (SG)

(72) Inventors: Andrew S. Auyeung, Ottawa (CA); Michael J. Craven, Kanata (CA); Huu Dang, Ottawa (CA); Harvey Hum, Ottawa (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 50 days.

(21) Appl. No.: 14/303,660

(22) Filed: Jun. 13, 2014

(65) Prior Publication Data

US 2015/0362167 A1 Dec. 17, 2015

(51) Int. Cl.
*F21V 5/00* (2015.01)
*F21V 29/00* (2015.01)
*F21V 8/00* (2006.01)
*F21Y 101/02* (2006.01)

(52) U.S. Cl.
CPC ............ *F21V 29/22* (2013.01); *F21V 29/004* (2013.01); *G02B 6/0096* (2013.01); *F21Y 2101/02* (2013.01)

(58) Field of Classification Search
CPC .. H01R 13/7172; G02B 6/0008; F21S 48/328
USPC ................................................. 362/555, 580
See application file for complete search history.

(56) References Cited

U.S. PATENT DOCUMENTS

| | | | |
|---|---|---|---|
| 7,086,765 B2 | 8/2006 | Wehner | |
| 7,220,005 B2 | 5/2007 | Yamasaki et al. | |
| 7,529,094 B2 | 5/2009 | Miller | |
| 7,601,021 B1* | 10/2009 | Yang | G02B 6/0008 439/487 |
| 7,621,773 B2* | 11/2009 | Bright | G02B 6/0008 439/490 |
| 7,866,851 B2 | 1/2011 | Chang | |
| 7,942,563 B2 | 5/2011 | Gingrich, III et al. | |
| 8,823,540 B2* | 9/2014 | Scholeno | H01R 12/716 340/815.4 |
| 2007/0253168 A1* | 11/2007 | Miller | G02B 6/4246 361/719 |
| 2012/0169235 A1 | 7/2012 | Dassanayake et al. | |

* cited by examiner

*Primary Examiner* — Andrew Coughlin
(74) *Attorney, Agent, or Firm* — Zilka-Kotab, PC

(57) ABSTRACT

An assembly for use with a heat producing electronic device is disclosed. The assembly may include a heat sink in thermally conductive contact with a shell containing the electronic device, and a light pipe having a first thermal conductivity and configured to transmit light from a light-emitting diode (LED) to a front side of the heat sink. The light pipe may include at least a portion having a thermally conductive layer with a second thermal conductivity greater than the first thermal conductivity. The thermally conductive layer may cover at least a portion of an outer surface of the light pipe, and be positioned between, and in thermally conductive contact with a portion of the heat sink protrusions. The thermally conductive layer may be designed to conduct and radiate heat away from at least a portion of the heat sink protrusions.

20 Claims, 4 Drawing Sheets

400
Light Pipe / Heat Sink
Assembly (Side View)

500
Light Pipe / Heat Sink
Assembly (Top View)

LIGHT PIPE HEAT SINK ELEMENT

BACKGROUND

The present disclosure generally relates to light pipes. In particular, this disclosure relates to light pipes having a thermally conductive coating designed to transfer and radiate heat away from a heat-producing electronic device.

A light pipe may be an inexpensive, molded structure which may be used to direct light from a light source such as a light emitting diode (LED) to a location where the light may be useful as a visual indicator. For example, a light pipe may be used to direct light emitted by an LED mounted on a printed circuit board (PCB) within a computer or other electronic device to a location on the device's case which may be easily viewed. Light transmitted by a light pipe and viewed by a user of an electronic device may be useful in indicating a status of the device, such as an "ON/OFF" status, "in use" status (e.g., of a hard drive), or "connected/disconnected" status (e.g., of a network connection). Light pipes may be fabricated from polycarbonate, glass, plastic, or other optical grade materials, in a wide variety of shapes suitable for particular applications. Light pipes may offer a cost-effective alternative that has a simplified assembly process relative to placing and wiring optical indicator devices (e.g., LEDs) in various locations within an electronic device.

A heat sink may be used in computers and electronic systems as a passive heat exchanger, and may act as a reservoir that can absorb an arbitrary amount of heat without significantly changing temperature. Heat sinks may be used in computers, for example, to cool devices such as central processing units (CPUs), graphics processing units (GPUs) and other types of electronic components, modules and assemblies. A heat sink may also dissipate heat produced by electronic devices into a medium, such as air, water, or a coolant/refrigerant. Heat sinks may reach a temperature greater than a cooling medium, in order to transfer heat across a thermal gradient from an electronic device to the medium, by convection, radiation, or conduction.

SUMMARY

Various aspects of the present disclosure may be useful for integrating enhanced cooling and optical signaling capability into an assembly that includes a heat producing electronic device. An assembly configured according to embodiments of the present disclosure may provide, through the use of a thermally conductive light pipe, enhanced operational limits and optical signaling capability for the heat producing electronic device.

Embodiments may be directed towards an assembly for use with a heat producing electronic device. The assembly may include a heat sink and a (first) light pipe. The heat sink may be in thermally conductive contact with a top side of a shell containing the heat-producing electronic device. The heat sink may include a top side having protrusions extending away from the top side, a front side, and a rear side. The assembly may also include a first light pipe configured to transmit, through a first optically transmissive core having a first thermal conductivity, light, received from a first light-emitting diode (LED) located on the heat producing electronic device, to the front side of the heat sink. The first light pipe may have a first portion configured to transmit light upwards from the LED and past the rear side of the heat sink, towards a second portion, optically connected to the first portion. The first light pipe may also have a second portion, configured to transmit light received from the first portion, from the rear side of the heat sink, along the top side of the heat sink to the front side of the heat sink. The second portion may include a thermally conductive layer having a second thermal conductivity greater than the first thermal conductivity. The thermally conductive layer may cover at least a portion of an outer surface of the optically transmissive core, and be positioned between, and in thermally conductive contact with at least a portion of the heat sink protrusions. The thermally conductive layer may also be designed to conduct and radiate heat away from at least a portion of the heat sink protrusions.

Embodiments may also be directed towards a light pipe kit for an assembly that includes a heat producing electronic device. The light pipe kit may include a heat sink and a first light pipe. The heat sink, when assembled, may be in thermally conductive contact with a top side of a shell containing the heat-producing electronic device. The heat sink may include a top side having protrusions extending away from the top side, a front side and a rear side. The first light pipe may be configured to, when assembled, transmit, through a first optically transmissive core having a first thermal conductivity, light, received from a first light-emitting diode (LED) located on the heat producing electronic device, to the front side of the heat sink. The first light pipe may have a first portion configured to, when assembled, transmit light upwards from the LED and past the rear side of the heat sink, towards a second portion optically connected to the first portion. The first light pipe may also have a second portion, configured to, when assembled, transmit light received from the first portion, from the rear side of the heat sink, along the top side of the heat sink to the front side of the heat sink. The second portion may have a thermally conductive layer having a second thermal conductivity greater than the first thermal conductivity. The thermally conductive layer may cover at least a portion of an outer surface of the optically transmissive core, and be positioned, when assembled, between, and in thermally conductive contact with at least a portion of the heat sink protrusions. The thermally conductive layer may be designed to, when assembled, conduct and radiate heat away from at least a portion of the heat sink protrusions.

Aspects of the various embodiments may be used to make efficient use of area within the dimensional constraints of standard sized compact electronic modules such as Quad (4-channel) Small Form-factor Pluggable (QSFP) transceivers. Aspects of the various embodiments may also be useful for providing cost-effective cooling and optical signaling for use with assemblies including heat producing electronic devices, by using existing and proven design and fabrication processes and assembly techniques.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
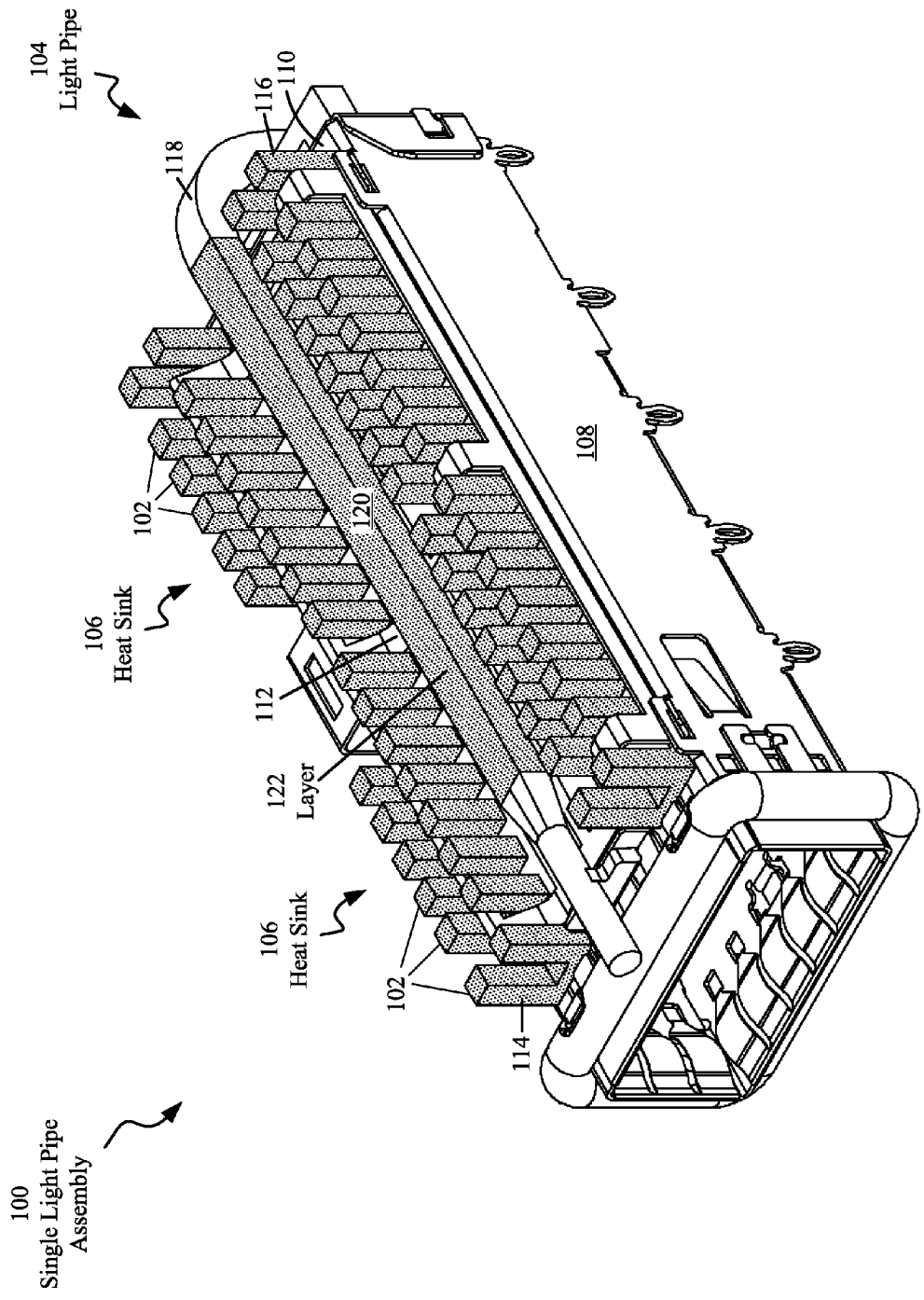
FIG. 1 is an isometric drawing of an assembly including a heat sink and a light pipe, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes

DETAILED DESCRIPTION

Certain embodiments of the present disclosure can be appreciated in the context of providing enhanced heat dissipation capability in conjunction with optical signaling through a light pipe, to compact electronic modules such as Quad Small Form-factor Pluggable (QSFP) transceivers, which may be used to interface a network device to a fiber optic cable. Such network devices may include, but are not limited to network switches, routers and media converters. While not necessarily limited thereto, embodiments discussed in this context can facilitate an understanding of various aspects of the disclosure. Certain embodiments may also be directed towards other equipment and associated applications, such as providing enhanced heat dissipation capability in conjunction with optical signaling through a light pipe, to compact electronic modules such as Small Form-factor Pluggable (SFP) transceivers, which may be used to interface a network device to a fiber optic or copper networking cable. SFP transceivers may be designed to support SONET, Gigabit Ethernet, Fibre Channel, and other communications standards. Embodiments may also be directed towards multiple-ganged electronic modules including, but not limited to, QSFP and SFP transceivers which may be used to interface network devices to network cabling.

For ease of discussion, the term "QSFP" is used herein, however, it is understood that various embodiments can also be useful with regards to other types of electronic modules.

Various embodiments of the present disclosure relate to a thermally conductive light pipe structure configured to be thermally coupled to a heat sink of an assembly including a heat producing electronic module. The light pipe may therefore be useful for providing enhanced cooling capability for the heat producing electronic module by conducting and dissipating heat transferred from the heat producing electronic module to the heat sink. A thermally conductive outer layer of the light pipe may provide surface area in addition to the surface area of the heat sink, which may be useful for both conducting and dissipating heat from the heat producing electronic device. Enhanced and efficient cooling of a heat producing electronic device may result from the use of a thermally conductive light pipe. Use of the thermally conductive light pipe may help to extend the operational limits of a heat producing electronic device (relative to limits without the use of a thermally conductive light pipe) while reducing noise resulting from cooling airflow over the light pipe/heat sink assembly. A metallic, thermally conductive outer layer of the light pipe may provide enhanced transmission of light through an optically transmissive core of the light pipe.

A light pipe/heat sink assembly designed according to certain embodiments may be compatible with existing and proven electronic equipment enclosures, and may be a useful and cost-effective way to enhance thermal and operational performance of compact heat producing electronic devices without compromising the optical performance of an associated light pipe. A light pipe/heat sink assembly constructed according to embodiments of the present disclosure may be installed on an existing heat producing electronic device.

Certain embodiments relate to providing enhanced heat dissipation capability in conjunction with optical signaling through a light pipe, to compact electronic modules. FIG. 1 is an isometric drawing of an assembly 100 including a heat sink 106 and a (first) light pipe 104, mounted on a shell 108, which may contain a heat producing electronic device, according to embodiments of the present disclosure.

Assembly 100 may be useful for housing heat producing electronic/optical devices and circuits that may be used, for example, to interface a network device to a fiber optic cable. Such electronic devices may include Quad (4-channel) Small Form-factor Pluggable (QSFP) transceivers, Small Form-factor Pluggable (SFP) transceivers, or other electronic devices. In certain embodiments, the heat-producing electronic device may include an integrated circuit (IC), and in certain embodiments the heat producing electronic device may include an electronic module having a plurality of interconnected electronic components.

Heat sink 106 may be attached to and in thermally conductive contact with a top side 110 of shell 108, and may be used to dissipate heat generated by the heat producing electronic device within shell 108. Heat sink 106 may include a plurality of heat sink protrusions 102, which may be thermally coupled to a base of the heat sink 106, and may provide surface area useful for dissipating heat transferred from the heat producing electronic device to heat sink 106.

Light pipe 104 may be designed to transmit light received from a (first) light emitting diode (LED) located on the heat producing electronic device, near a rear side 116 of the heat sink 106, to a location near a front side 114 of the heat sink 106. Light pipe 104 may be useful in creating a path for transmitting light from the LED to a location where it may be easily viewed. Light transmitted by light pipe 104 may be useful in indicating the status of a heat producing electronic device, for example, the connection speed of a network interface circuit.

Light pipe 104 may have a first portion 118 configured to transmit light upwards from the LED and past the rear side 116 of the heat sink 106, towards a second portion 120 of light pipe 104 that is optically connected to the first portion 118. The second portion 120 may be configured to transmit light received from the first portion 118, from the rear side 116 of the heat sink, along the top side 112 of the heat sink 106 to a location near the front side 114 of the heat sink 106.

Shell 108 may be constructed from sheet metal or other thermally conductive materials, and may be designed according to industry-standard dimensions, to fit within standard sized (e.g.; QSFP) openings in electronic equipment housings. Shell 108 may be designed to contain a heat producing electronic device, such as a network transceiver, and may be useful in electromagnetically shielding and conducting heat away from the heat producing electronic device. In embodiments, a heat producing electronic device within shell 108 may be thermally coupled through direct contact with the shell, and in certain embodiments may be thermally coupled to the shell through convective air movement.

Densely populated electronic modules such as assembly 100, may be located within an enclosed equipment chassis, and may include use of light pipes. Light pipes used with LEDs may be constructed from materials such as plastic or polycarbonate, which may have an optically transmissive core that is thermally insulative, and may occupy space that could otherwise be used for conventional heat sink 106 elements such as heat sink protrusions 102. For example, a light pipe 104 positioned at the top of an assembly 100 may restrict the number of heat sink protrusions 102 which may extend upwards from heat sink 106, which may limit the heat dissipation capability of heat sink 106.

According to embodiments, adding a layer 122 of thermally conductive material (such as metal foil) to an outer surface of the light pipe 104 and positioning light pipe 104 to make thermal contact between the added layer 122 of thermally conductive material and an adjacent heat sink 106 may enhance the heat conduction and dissipation capability of the assembly 100 (including heat sink 106) without compromising the optical performance of light pipe 104. A layer 122 of thermally conductive material, such as metal foil, may have a (second) thermal conductivity greater than the (first) thermal conductivity of the light pipe's optically transmissive core material.

In certain embodiments, increasing the overall heat dissipation capability and efficiency of assembly 100 through the use of thermally conductive light pipes may extend the operational limits (e.g.; operational speed) of heat producing electronic devices contained within shell 108. In certain embodiments, increased heat dissipation efficiency may result in a reduced volume of air required to cool assembly 100 and a corresponding decrease in noise produced by airflow across heat sink 106.

Light pipe 104 fabrication techniques may include, but are not limited to, hot stamping and the use of adhesives to attach a thermally conductive metal layer, such as foil, onto at least a portion of an outer surface of the light pipe's 104 optically transmissive core. Other fabrication techniques may include electroless & electrolytic plating and application of conductive paint to deposit a metallic film on at least a portion of an outer surface of the light pipe's optically transmissive core. Potential fabrication techniques used to apply a thermally conductive layer to the core may need to be tested before production use, to ensure that the optical transmission capability of the core material is not adversely affected during the thermally conductive layer attachment/application process. According to embodiments, various thermally conductive layer designs and assembly techniques may be chosen for a particular application, depending on a certain light pipe's core dimensions, shape, profile and core material type.

The light pipe 104 may be assembled onto the heat sink 106 using a press-fit technique, and may be held onto the top of the heat sink 106 using a clip or other fastening device. The light pipe 104 may be positioned between, and in thermally conductive contact with at least a portion of the heat sink protrusions 102. A thermal interface material (TIM) or thermal grease may be used during an assembly process to ensure robust, highly conductive thermal contact between the heat sink 106 protrusions 102 and the light pipe 104.

Figure 2:
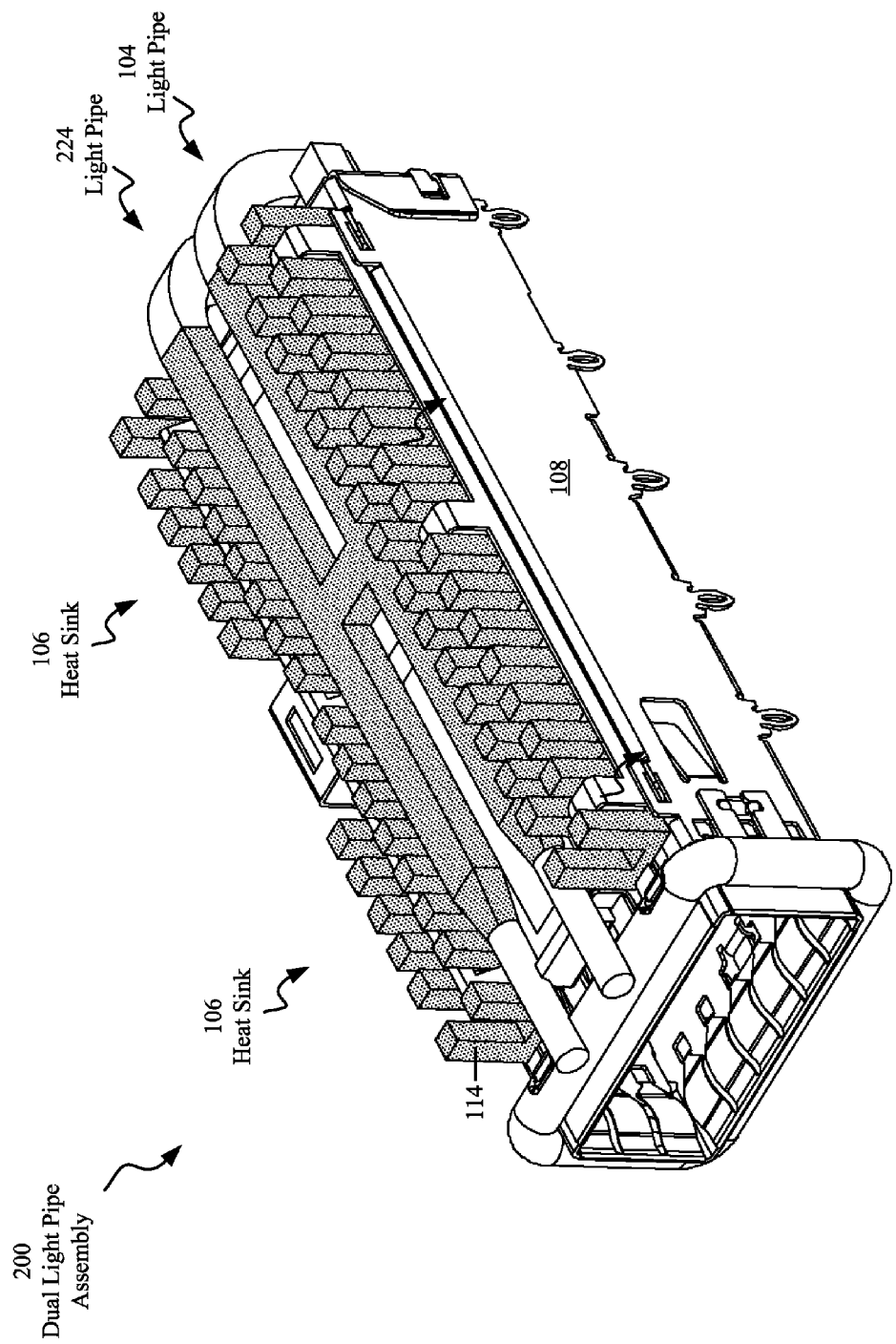
FIG. 2 is an isometric drawing of an assembly including a heat sink and two light pipes, according to embodiments.

FIG. 2 is an isometric drawing of an assembly 200 including a heat sink 106, a (first) light pipe 104, and a (second) light pipe 224, mounted on a shell 108, which may contain a heat producing electronic device, according to embodiments consistent with FIG. 1. The structure, interconnections and functions of assembly 200 may be consistent with those of assembly 100 (FIG. 1). Assembly 200 may be useful for housing heat producing electronic/optical devices and circuits that may be used, for example, to interface a network device to a fiber optic cable, consistent with FIG. 1.

Second light pipe 224 may be configured to transmit, through a second optically transmissive core, light, received from a second light-emitting diode (LED) located on the heat producing electronic device, to the front side 114 of the heat sink 106, the second light pipe 224 having a first portion and a second portion, consistent with (first) light pipe 104 (FIG. 1).

In some embodiments, (first) light pipe 104, and (second) light pipe 224 may be useful for transmitting light from a single LED, or from LEDs configured to be illuminated simultaneously, to increase the amount of light viewable near the front side 114 of the heat sink 106.

In certain embodiments, (first) light pipe 104 may be useful for transmitting light from a first LED, and (second) light pipe may be useful for transmitting light from a second LED, to provide two unique visual indications of a state of a heat producing electronic device housed within shell 108. For example, light pipe 104 may transmit light indicating the connection state (e.g.; "connected" or "disconnected") of a network interface device, while light pipe 224 may transmit light indicating the connection speed (e.g.; 100 Mbps or 1000 Mbps) of the network interface device.

Figure 3:
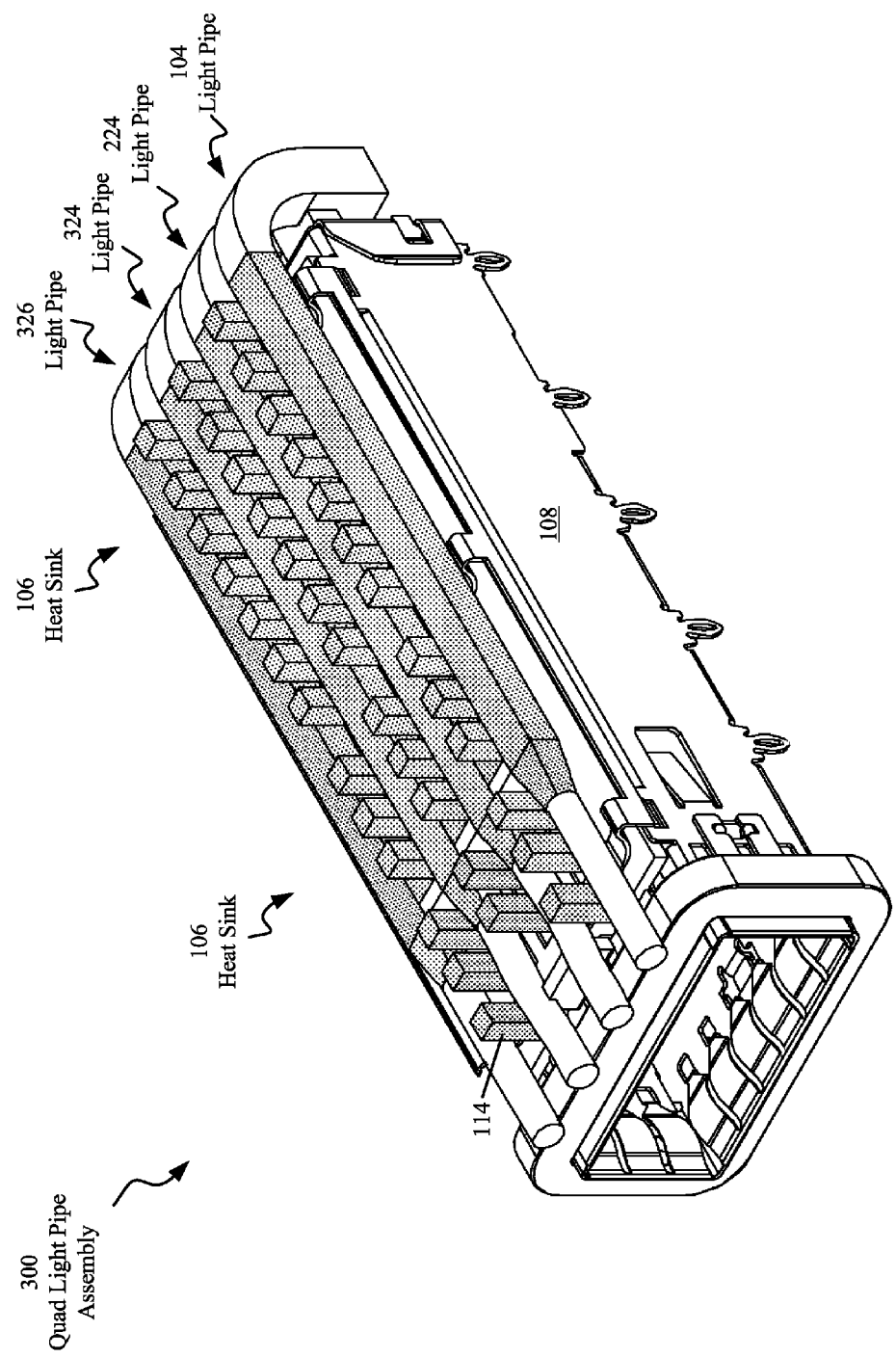
FIG. 3 is an isometric drawing of an assembly including a heat sink and four light pipes, according to embodiments.

FIG. 3 is an isometric drawing of an assembly 300 including four light pipes 104, 224, 324 and 326 and a heat sink 106, mounted on a shell 108, which may contain a heat producing electronic device, according to embodiments consistent with the figures. The structure, interconnections and functions of assembly 300 may be consistent with those of assemblies 100 (FIG. 1) and 200 (FIG. 2). Assembly 300 may be useful for housing heat producing electronic/optical devices and circuits that may be used, for example, to interface a network device to a fiber optic cable, consistent with FIG. 1, 2.

Light pipes 104, 224, 324 and 326 may be configured to transmit, through optically transmissive cores, light, received from a plurality of light-emitting diodes (LEDs) located on the heat producing electronic device, to the front side 114 of the heat sink 106, each of the light pipes 104, 224, 324 and 326 having a first portion and a second portion, consistent with light pipe 104 (FIG. 1).

In some embodiments, various combinations of light pipes 104, 224, 324 and 326 may be useful for transmitting light from a single LED, or from LEDs configured to be illuminated simultaneously, to increase the amount of light viewable near the front side 114 of the heat sink 106.

In certain embodiments, light pipes 104, 224, 324 and 326 may be useful for transmitting light from a plurality of individually illuminated LEDs, in order to provide a plurality of unique visual indications of a state of a heat producing electronic device housed within shell 108. For example, light transmitted by a particular light pipe (104, 224, 324 or 326) may be used to indicate the connection state (e.g.; "connected" or "disconnected") of a network interface device, while light transmitted by another light pipe (104, 224, 324 or 326) may be used to indicate the connection speed (e.g.; 100 Mbps or 1000 Mbps) of the network interface device.

FIG. 3 depicts 4 light pipes (104, 224, 324 and 326) traversing the heat sink 106, however certain embodiments may include other numbers of light pipes.

Figure 4:
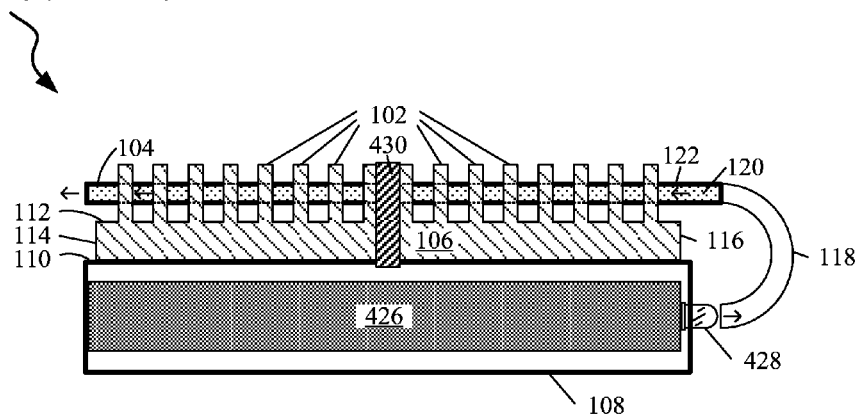
FIG. 4 is a side view drawing of an assembly including a heat sink and a light pipe, according to embodiments.

FIG. 4 is a side view drawing of an assembly 400 including a heat sink 106 and a light pipe 104, mounted on a shell 108, which may contain a heat producing electronic device 426, according to embodiments consistent with the figures. The structure, interconnections and functions of assembly 400 may be consistent with those of assemblies 100 (FIG. 1), 200 (FIG. 2) and 300 (FIG. 3). Assembly 400 may be useful for housing heat producing electronic/optical devices and circuits that may be used, for example, to interface a network device to a fiber optic cable, consistent with the figures.

Heat sink 106 may be attached to, and in thermally conductive contact with, a top side 110 of shell 108, and may be used to dissipate heat generated by the heat producing electronic device 428 within shell 108. Heat sink 106 may include a plurality of heat sink protrusions 102, a top side 112, a front side 114 and a rear side 116.

Light pipe 104 may be designed to transmit light received from a (first) light emitting diode (LED) 428 located on the heat producing electronic device 426, near a rear side 116 of the heat sink 106, to a location near a front side 114 of the heat sink 106. Light pipe 104 may include a first portion 118 of an optically transmissive core configured to receive light from LED 428 and transmit it upwards and past the rear side 116 of the heat sink 106, to a second portion 120 of an optically transmissive core of light pipe 104 that is optically connected to the first portion 118. The second portion 120 may be configured to transmit light received from the first portion 118, from the rear side 116 of the heat sink, along the top side 112 of the heat sink 106 to a location near the front side 114 of the heat sink 106. A thermally conductive layer 122 may be attached to or formed on at least part of an outer surface of the second portion 120.

In certain embodiments, the outer layer 122 of the light pipe 104 may be placed in thermally conductive contact with a first portion and a second portion of the heat sink 106, which may be useful in conducting heat from the first portion to the second portion and limiting temperature gradients across the heat sink 106. Increased heat dissipation efficiency may result from limiting heat sink 106 temperature gradients.

Shell 108 may be constructed from sheet metal or other thermally conductive materials, and may be designed to contain a heat producing electronic device 426. In embodiments, a heat producing electronic device may be thermally coupled to the shell 108 through convective air movement within shell 108, and in certain embodiments heat producing electronic device 426 may be thermally coupled through direct contact with the shell 108.

Clip 430, when engaged as part of assembly 400, may be useful in providing a downwards (compressive) force to hold light pipe 104 in place, and in thermally conductive contact with heat sink 106, and hold heat sink 106 in thermally conductive contact with shell 108.

Figure 5:
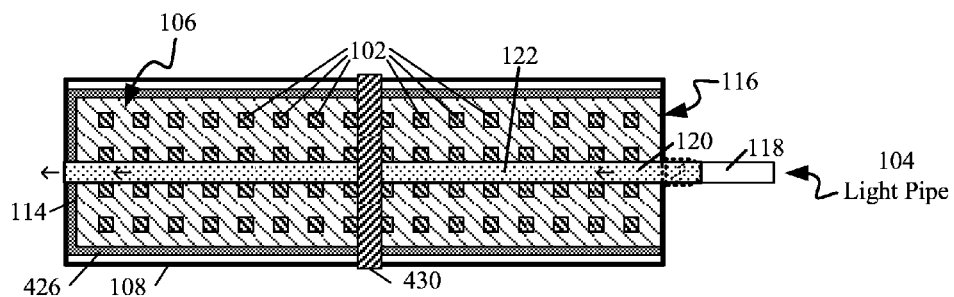
FIG. 5 is a top view drawing of an assembly including a heat sink and a light pipe, according to embodiments.

FIG. 5 is a top view drawing of an assembly 500 including a heat sink 106 and a light pipe 104, mounted on a shell 108, which may contain a heat producing electronic device 426, according to embodiments consistent with the figures. The structure, interconnections and functions of assembly 500 may be consistent with those of assemblies 100 (FIG. 1), 200 (FIG. 2), 300 (FIG. 3) and 400 (FIG. 4). Assembly 500 may be useful for housing heat producing electronic/optical devices and circuits that may be used, for example, to interface a network device to a fiber optic cable, consistent with the figures.

Assembly 500 may include a shell 108 which may house heat producing electronic device 426, a heat sink 106, a light pipe 104 and a clip 430, as previously described. The heat sink 106 may have a front side 114, a rear side 116 and protrusions 102 extending from a top side 112 (FIG. 4) of a base of the heat sink 106. Light pipe 104 may include a first portion 118 and a second portion 120. A thermally conductive layer 122 may be attached to an outer surface of second portion 120 of the light pipe 106. Clip 430 may be used to hold assembly 500 together.

A kit of parts including heat sink 106, light pipe 104, and clip 430 may be useful for adding light pipe signaling capability in conjunction with enhanced heat dissipation capability to assembly 500. The kit may optionally include material such as a thermal interface material (TIM) or thermal compound (grease) which may be useful in ensuring a thermally conductive connection between the thermally conductive outer layer 122 of light pipe 104 and heat sink 106.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An assembly for use with a heat producing electronic device, comprising:
    a heat sink in thermally conductive contact with a top side of a shell containing the heat-producing electronic device, the heat sink including:
        a top side having protrusions extending away from the top side;
        a front side; and
        a rear side; and
    a first light pipe configured to transmit, through a first optically transmissive core having a first thermal conductivity, light, received from a first light-emitting diode (LED) located on the heat producing electronic device, to the front side of the heat sink, the first light pipe having:
        a first portion configured to transmit light upwards from the LED and past the rear side of the heat sink, towards a second portion optically connected to the first portion; and
        the second portion, configured to transmit light received from the first portion, from the rear side of the heat sink, along the top side of the heat sink to the front side of the heat sink, and including a thermally conductive layer having a second thermal conductivity greater than the first thermal conductivity, the thermally conductive layer:
            covering at least a portion of an outer surface of the optically transmissive core;
            positioned between, and in thermally conductive contact with at least a portion of the heat sink protrusions; and
            designed to conduct and radiate heat away from at least a portion of the heat sink protrusions.

2. The assembly of claim 1, wherein the thermally conductive layer includes metallic foil.

3. The assembly of claim 1, wherein the thermally conductive layer includes a metallic film deposited on at least a portion of an outer surface of the optically transmissive core.

4. The assembly of claim 1, wherein the thermally conductive layer includes thermally conductive paint.

5. The assembly of claim 1, wherein the optically transmissive core is thermally insulative.

6. The assembly of claim 1, wherein the heat-producing electronic device includes an integrated circuit (IC).

7. The assembly of claim 1, wherein the heat-producing electronic device is an electronic module.

8. The assembly of claim 1, wherein the heat-producing electronic device is an electronic component.

9. The assembly of claim 1, further comprising a second light pipe configured to transmit, through a second optically transmissive core, light, received from a second light-emitting diode (LED) located on the heat producing electronic device, to the front side of the heat sink, the second light pipe having a first portion and a second portion.

10. The assembly of claim 1, wherein the first light pipe is in thermally conductive contact with a first portion of the heat sink and with a second portion of the heat sink.

11. A light pipe kit for an assembly that includes a heat producing electronic device, the light pipe kit comprising:
- a heat sink to, when assembled, be in thermally conductive contact with a top side of a shell containing the heat-producing electronic device, the heat sink including:
  - a top side having protrusions extending away from the top side;
  - a front side; and
  - a rear side; and
- a first light pipe configured to, when assembled, transmit, through a first optically transmissive core having a first thermal conductivity, light, received from a first light-emitting diode (LED) located on the heat producing electronic device, to the front side of the heat sink, the first light pipe having:
  - a first portion configured to, when assembled, transmit light upwards from the LED and past the rear side of the heat sink, towards a second portion optically connected to the first portion; and
  - the second portion, configured to, when assembled, transmit light received from the first portion, from the rear side of the heat sink, along the top side of the heat sink to the front side of the heat sink, the second portion including a thermally conductive layer having a second thermal conductivity greater than the first thermal conductivity, the thermally conductive layer:
    - covering at least a portion of an outer surface of the optically transmissive core;
    - positioned, when assembled, between, and in thermally conductive contact with at least a portion of the heat sink protrusions; and
    - designed to, when assembled, conduct and radiate heat away from at least a portion of the heat sink protrusions.

12. The light pipe kit of claim 11, further comprising a thermal material to create a thermally conductive contact between the light pipe and the heat sink, wherein the thermal material includes at least one member of a group consisting of: thermal interface material (TIM) and thermal compound.

13. The light pipe kit of claim 11, further comprising a clip to attach the light pipe to the heat sink.

14. The light pipe kit of claim 11, wherein the thermally conductive layer includes metallic foil.

15. The light pipe kit of claim 11, wherein the thermally conductive layer includes thermally conductive paint.

16. The light pipe kit of claim 11, wherein the thermally conductive layer includes a metallic film deposited on at least a portion of an outer surface of the optically transmissive core.

17. The light pipe kit of claim 11, further comprising a second light pipe configured to transmit, through a second optically transmissive core, light, received from a second light-emitting diode (LED) located on the heat producing electronic device, to the front side of the heat sink, the second light pipe having a first portion and a second portion.

18. The light pipe kit of claim 11, wherein, when assembled, the first light pipe is in thermal contact with a first portion of the heat sink and with a second portion of the heat sink.

19. The light pipe kit of claim 11, wherein the optically transmissive core is thermally insulative.

20. The light pipe kit of claim 11, wherein the heat-producing electronic device is an electronic module.

* * * * *